United States Patent Office 3,702,782

Patented Nov. 14, 1972

1

3,702,782

REACTION OF ETHYLENE/MALEIC ANHYDRIDE STATISTICAL COPOLYMERS WITH POLYAMINES

Jean-Pierre Barozier, Lens, and Adrien Nicco, Bethune, France, assignors to Ethylene-Plastique, Paris, France No Drawing. Filed May 19, 1970, Ser. No. 38,885
Claims priority, application Great Britain, May 19, 1969, 25,404/69
Int. Cl. B44d 5/12
U.S. Cl. 117—118 8 Claims

ABSTRACT OF THE DISCLOSURE

A method of modifying the physical and chemical properties of ethylene/maleic anhydride statistical copolymers by treating them with a polyamine. The polyamine diffuses into the polymer and reacts with groups derived from the maleic anhydride, thereby partially or totally cross-linking the copolymer. Shaped articles of the copolymer may be so treated to modify their surface properties and, if they are less than about 1 cm. thick, to modify their bulk properties. The treated copolymers have good heat resistance and electrical insulating properties.

This invention relates to a method of modifying the physical and chemical properties of ethylene/maleic anhydride statistical copolymers.

Statistical copolymers of ethylene and maleic anhydride are known and are normally prepared by continuous radical copolymerisation of ethylene and maleic anhydride in an agitated reactor under a high pressure, for example greater than 1,000 atmospheres and at a temperature of from about 90° to 280° C. These copolymers may also contain small amounts of units originating from other monomers such as propylene, butene, isobutene, and vinyl esters or ethers.

These binary or ternary copolymers retain a crystalline structure similar to that of polyethylene and consequently have a melting range of from about 80° to 125° C. Generally, they have good mechanical properties.

We have now found that many properties of these copolymers may be advantageously modified by reacting some or all of these anhydride-derived groups in the copolymers with the amine groups of polyamines having at least one reactive amine group such as —NHR or —$NH_2$, i.e. with the amine groups of primary or secondary polyamines.

Accordingly, the invention provides a method of modifying the physical and chemical properties of an ethylene/maleic anhydride statistical copolymer (as herein defined) which has been obtained by copolymerisation of the monomers at an elevated pressure, which method comprises treating the copolymer with a primary or secondary polyamine.

Preferably the polyamine has a molecular weight greater than 60 and preferably also the treatment is carried out at a temperature from 0° to 250° C.

By "an ethylene/maleic anhydride statistical copolymer" we mean a statistical copolymer of ethylene and maleic anhydride or a statistical terpolymer of ethylene, maleic anhydride and a minor amount of a copolymerisable monomer such as propylene, butene, isobutene or a vinyl ester or ether.

2

Preferably, the copolymer to be treated contains from 0.5 to 20% by weight of units derived from maleic anhydride. The grade of the copolymer to be treated is from 0.1 to 5000, preferably from 1 to 1000.

Whilst copolymers which have not been formed into any particular desired shape may be treated by the method of the invention, the method is particularly useful for treating the copolymers after they have been formed into a desired shape. Thus, the invention is useful for treating, for example, films, tubes or coating layers of the copolymers. If the copolymer article is thin enough, for example less than about 1 centimetre thick, and if it is so desired, reaction of the copolymer with a polyamine may be effected homogeneously throughout the mass of the copolymer and may cause considerable cross-linking of the latter. On the other hand, with a thick article, reaction may occur only at or near its surface and the surface properties only of the article are thereby modified.

The depth to which reaction takes place is governed by the depth to which the polyamines diffuse into the copolymer. When it is desired to treat only the surface of the copolymer for example from a depth of 5 to 50 microns, the polyamine used (or solution thereof) should generally have a low rate of diffusion into the copolymer (under the conditions used). Conversely, when it is desired to cross-link the whole of a thin article, the polyamine (or solution thereof) should be one which readily diffuses into the copolymer (under the conditions used). For this purpose, primary or secondary polyamines which are substituted with alkyl radicals having 2 or 3 carbon atoms, are preferred, the polyamines having no other substituents, and preferably being of molecular weight less than 200.

The depth to which the polyamines penetrate the copolymer is controlled by, among other things, the time of contact of the copolymer with the polyamine supply, the temperature and the viscosity of the polyamine or polyamine solution. The polyamine may be used alone in the gaseous or liquid state, or in solution in one or more solvents. Generally, when the polyamine is mixed with solvents in liquid or vapour form, the copolymer being treated tends to swell and the rate of diffusion of the polyamine into the article is increased. The viscosity of a solution of a polyamine is also generally less than that of the polyamine per se, and this reduced viscosity tends to increase the diffusion rate. It has also been found that, when using a solution of the polyamine, the concentration of the solution affects the properties of the treated copolymer obtained. For example, with a given solvent, the breaking load of the treated copolymers passes through a maximum as the concentration of the polyamine solution is increased.

Among the solvents which can be used, either alone or in admixture with one or more others, are for example aromatic hydrocarbons and cyclohexane and methylcyclohexane. Other solvents which are inert with respect to the anhydride-derived units under the experimental conditions used but which improve the solubility of the polyamine may be used in admixture with the above solvents, examples being secondary and tertiary alcohols, ketones, ethers, esters or pyridine.

The method of the invention is carried out at a temperature from 0° to 250° C., preferably from 0° to 220° C. Temperatures above the melting temperature of the copolymer should preferably not be used unless the copolymer is supported on a substrate (which itself does not melt at the temperature used) or unless crude copolymer is being treated.

The polyamines which may be used in the method of the invention include polyamines such as trimethylene tetramine, tetraethylene pentamine and polyethylene imines of varying molecular weights.

Compounds which are obtained by the condensation of epoxides, such as ethylene oxide, with polyamines before or after reaction of these polyamines with the copolymer, may also be used. Preferably the polyamines will have a molecular weight no greater than 200 when complete reaction of thin articles is required, but greater than 140 when surface-treatment only is desired. When surface-treatment only is carried out, the polyamine preferably contains one or more alkyl, hydroxyalkyl or dihydroxyalkyl substituent groups each containing 2 or 3 carbon atoms.

The copolymers may contain conventional fillers such as carbon, black, limestone, calcined kaoline, silica, talc, asbestos, and other additives such as pigments, stabilisers, antioxidants and U.V. ray absorbing agents. The method of cross-linking according to the invention is not impeded by the presence of antioxidants in the copolymers.

By treating an article of an ethylene/maleic anhydride copolymer with a polyamine having only a low diffusibility into the body of the article, or by operating under conditions which produce a low diffusibility, the polyamine reacts with the anhydride-derived units in the outer layer of the article and becomes attached thereto by covalent chemical bonds. The part of the polyamine molecule which does not react with the anhydride-derived units may impart improved surface properties to the copolymer article, e.g. improved wettability, electrical conductivity (and hence improved antistatic properties), improved coefficient of friction or improved surface adhesion properties which facilitate printing and glueing. The unreacted part of the polyamine molecule may contain one or more amine or other polar groups which remain unreacted with the copolymer.

The cross-linked copolymers obtained by the method of the invention can be characterised by their melt index (measured at 190° C. to ASTM Standard D 1238–62 T) which is lower than 0.01 dg./mn., their high gel content and their resistance to stress-cracking. The gel content is determined by Soxhlet extraction with xylene for 24 hours; the gel percentage is:

$$\frac{\text{weight of insoluble part}}{\text{weight of sample}}\times 100$$

The cross-linked copolymers produced according to the invention have numerous applications because of their good mechanical properties and particularly their resistance to heat. They can be used as bags for enclosing hot products, for pipes which are resistant to heat and stress-cracking, for insulators for electric cables and for any articles for which the mechanical properties of conventional high-pressure polyethylene or its heat-resistance are inadequate.

In order that the invention may be more fully understood, the following examples are given by way of illustration only. Example 1 illustrates the preparation of ethylene/maleic anhydride statistical polymers, and Examples 2–18 illustrate the method of the invention. In the examples, the wettability of a surface is determined by measuring the contact angle ($\theta$) of a drop of distilled water deposited on the surface, the smaller the angle, the greater being the wettability of the surface.

EXAMPLE 1

Ethylene was copolymerised continuously with maleic anhydride in a 6-litre volume agitated reactor. The operating conditions were as follows: pressure 1700 atmospheres, temperature from 190 to 235° C.; catalysts: tertiary butyl perpivalate and tertiary butyl 2-ethyl perhexanoate. The maleic anhydride was injected in a 0.25 kg./l. solution in benzene (injection temperature: 60–80° C.). Rates of feed: ethylene: 57 kg./h.: maleic anhydride: 0.3 kg./h.; copolymer production: 8.5 kg./h.

The resulting copolymer (I) had the following properties: maleic anhydride content: 3.5% by weight; melt index: 1.4 g./10 min.; $CH_3$ number per 1000 C atoms; 18.3; intrinsic viscosity: 1.1. Melting temperature, determined by differential thermal analysis: 107.4° C. Other copolymers (to tbe described in the following examples) were prepared by the same process but with different parameters (more particularly different pressures, temperatures, and ethylene and anhydride feed rates). The properties of these various products are given in Table I.

TABLE I

| Copolymer | $CH_3$ number per 1,000 C | Intrinsic viscosity | Melt index, g./10 min. | Units derived from maleic anhydride, percent by weight | Young's modulus of elasticity | Creep threshold: Load, kg./cm.² | Creep threshold: Elongation, percent | Break: Load, kg./cm.² | Break: Elongation, percent |
|---|---|---|---|---|---|---|---|---|---|
| I | 18.3 | 1.1 | 1.4 | 3.5 | 1,450 | 88 | 18 | 147 | 513 |
| II | 26.3 | 1.18 | 2.1 | 2.1 | 1,400 | 79 | 18 | 112 | 466 |
| III | 25.3 | 0.93 | 17 | 3.2 | 1,350 | 84 | 18 | 84 | 250 |
| IV | | 0.36 | 1,000 | 8 | | | | | |
| V | 20 | 1.14 | 2.3 | 2.8 | 1,710 | 88 | 18 | 138 | 465 |

NOTE.—Melt indices: ASTM Standards D 1238–62 T. Mechanical properties measured on 0.5 mm. thick sheets, ASTM D 638 test pieces. Speed of traction: modulus 2 mm./min.; other properties: 50 mm./mn.

In the following examples, unless otherwise indicated, the copolymers were protected from oxidation by the addition of 0.01% of ditert.butyl paracresol.

Examples 2 to 8 show methods of considerably modifying the surface properties of copolymer articles. The other examples illustrate methods of cross-linking copolymers or copolymer articles.

EXAMPLE 2

Copolymer I described above was moulded to form a film 0.1 mm. thick, 50 mm. wide and 100 m. long. This film was immersed for 1 second in tetraethylene pentamine (designated T.E.P.A. 1) in the pure state or in 20% solution in toluene, and then left between glass plates for 1½ hours. It was then washed with distilled water, exposed to air for 24 hours, and then exposed alternately to water (15 days) and to air (15 days) for several months. Measurements of the contact angle on the dry film are shown in Table II.

In the following examples, the films of copolymer I were treated in the same manner as described in Example 2.

EXAMPLE 3

A wetting agent was prepared as follows: 20 g. of T.E.P.A. (0.106 mol) were dissolved, at ambient temperature, in 100 cc. of isopropyl alcohol, and 31.4 g. (0.424 mol) of glycidol were added in one hour; the temperature increased to 60° C. 100 cc. of toluene were added after the reaction had ceased. The resulting 20% tetraethylene pentamine tetraepoxide solution (designated T.E.P.A. 2) was used to treat a film of copolymer I as described in Example 2. Measurements of the contact angle are shown in Table II.

EXAMPLE 4

A commercial solution of 50% by weight of polyethylene imine in water (FLUKA 03.880) having a molecular weight between 30,000 and 40,000 was dehydrated by distillation of the ternary azeotrope: water (13.1%), isopropanol (38.2%) and toluene (48.4%). The resulting product (designated P.E.I. 1) was dissolved to a proportion of 20% in a mixture of toluene (50%) and isopropanol (50%); this solution was used to treat a film of copolymer I as described in Example 2. The contact angle measurements are shown in Table II.

EXAMPLE 5

A wetting agent was prepared as follows: 312 g. of ethylene imine were dissolved in 100 cc. of a mixture of isopropanol (80 cc.), water (20 cc.) and toluene (50 cc.). Polymerisation of the ethylene imine was catalysed by the addition of 0.425 g. of a 35% hydrochloric acid aqueous solution. The reaction was continued for 1 hour at ambient temperature with agitation whereafter the temperature was raised to 75° C. during 1½ hours. The solvents were removed by distillation. The resulting product (31.5 g.) (designated P.E.I. 2) was dissolved to a proportion of 20% in the following mixtures: toluene (50%) and isopropanol (50%); toluene (50%) and pyridine (50%); these solutions were used to treat a film of copolymer I as described in Example 2. The contact angle measurements are shown in Table II.

By way of comparison, Table II also includes contact angle measurements on a conventional high-pressure polythene (PE) having a 2 g./10 min. melt index and on the copolymer I exposed under the same conditions as the treated products.

TABLE II

[Percentages are by weight]

| Polymer | Polyamine wetting agent | Solvents | Contact angles in degrees: After 24 hours | Contact angles in degrees: After 3 months |
|---|---|---|---|---|
| P.E. | | | 99.2 | 76 |
| Copolymer I | | | 98.3 | 65 |
| | T.E.P.A. 1 | | 59 | 60 |
| Do | T.E.P.A. 2 | Toluene | 60 | 53 |
| | | do | 61 | 59 |
| Do | P.E.I. 1 | Toluene 50%; isopropanol 50% | 47 | 54 |
| Do | P.E.I. 2 | Toluene 50%; isopropanol 50% | 58.5 | 51 |
| Do | | Toluene 50%; pyridine 50% | 58.3 | 50 |

The above-indicated angles are the angles of lead ($\theta.A$) measured on a growing drop by means of a contact angle goniometer. It is known that this angle presents only one aspect of the phenomenon and that there is an angle of lag ($\theta.R$) which is generally different from the above angle and which is measured on a drop undergoing resorption. It is generally accepted that the behaviour is largely due to the surface roughness. The actual contact angle $\theta$ is between the above two angles: $\theta R<\theta<\theta A$.

Measurements of $\theta.R$ on drops during their evaporation (temperature: 21° C., relative humidity: 55%) gave the value $70°<\theta.R<72°$ in the case of polyethylene. In the case of the treated copolymers, $\theta.R$ was less than 10°, the measuring instrument being unable to determine contact angles below 10°. In the case of these products, a rolling drop of water left a continuous and permanent wet mark. In the case of the untreated copolymers or the polyethylene, the mark left by a rolling drop of water combined into fine droplets.

EXAMPLE 6

The wettability was also determined by using the "rotating plane" method (see MacDougell and C. Ockrent, "The Adhesion of Liquids to Solids," Proc. Roy Soc. London, 1942, 180 A, 151). The method is based on measuring the angle of a plane at which a drop of water of given volume on the plane begins to roll down the inclination of the plane being increased at a given constant angular speed until rolling begins. It is found that the angle of inclination $a$ and the volume V of the drop are related by the following expression:

$$\sin a=K.V.^{-2/3}$$

and the coefficient K increases with the wettability of the polymer.

(a) After a film of copolymer I had been treated by immersion in a solution of polyethylene imine of molecular weight approximately 30,000 in 25% solution in water at 70° C., ethylene oxide was condensed on the free amino groups by immersion in a 15% solution of ethylene oxide in toluene at 20° C. The value of K obtained before and after the second treatment is given in Table III.

(b) After treatment with polyethylene imine under the same conditions as in (a) above, the film of copolymer I was immersed in a 25% glycidol solution in water at 20° C. The value obtained for K is given in Table III.

(c) The film of copolymer III was first treated with T.E.P.A. (15% toluene, temperature=20° C.) and then with glycidol (25% toluene, temperature 20° C.). The value obtained for K is shown in Table III.

TABLE III

| Copolymer | 1st treatment | 2nd treatment | K |
|---|---|---|---|
| I | | | $0.07_5$ |
| I | P.E.I. | | $0.11_8$ |
| III | T.E.P.A. | | 0.10 |
| I (product of (a)) | P.E.I. | Ethylene oxide | 0.110 |
| I (product of (b)) | P.E.I. | Glycidol | 0.091 |
| III (product of (c)) | T.E.P.A. | Glycidol | 0.091 |

EXAMPLE 7

Two films of copolymer II, after being treated under the conditions described in Example 2, were glued with commercial products such as Araldite 970 B or Epoxyd Weichmacher B 316, using polyamines as curing agents. The adhesive force was greater than the breaking strength of the polymer under test.

EXAMPLE 8

Examination of anti-static properties

The film of copolymer I was treated under the conditions described in Examples 2 and 4. Its anti-static properties were measured by the "cigarette-ash" test and by determining its surface resistivity.

The "cigarette-ash" test consists in measuring the height at which fresh cigarette ash is attracted by the polymer when it has been charged by friction. Cigarette ash was replaced by powdered silica gel dried for 5 hours at 100° C.

The surface resistivity was measured to A.S.T.M. Standard D 257–54 T at 500 volts in an atmosphere adjusted to a hygrometric index of ±5 at a temperature of 21°±1.

The results are shown in Table IV.

TABLE IV

| Copolymer | Height in mm. | Resistivity |
|---|---|---|
| Control, copolymer I | 27 | $10^{15}$–$10^{16}$ |
| Treated according to Example 4 | 5 | $10^{13}$–$10^{14}$ |
| Treated according to Example 2 | 5 | $10^{11}$–$10^{12}$ |

EXAMPLE 9

Copolymer I was extruded to form a sheath 0.15 mm. thick. This sheath was opened and immersed in solutions containing various concentrations of polyamines in toluene at a temperature of 50° C. for the time indicated in Table V; cross-linking took place by hot diffusion during immersion. The films were washed with water and dried as soon as they were removed from the bath.

The mechanical properties of the sheath which had been cross-linked by various polyamines are given in Table V:

TABLE V

Cross-linking by polyamines in solution in toluene

[Temperature: 50° C.—sheath (100 to 150μ); Control: Untreated copolymer]

| Cross-linking agent | Cross-linking agent, percent by weight | Contact time, min. | Direction of traction | Creep threshold, kg./cm.² | Breaking load, kg./cm.² | Elongation at break, percent |
|---|---|---|---|---|---|---|
| Control | | | L | 123 | 193 | 554 |
| | | | T | 135 | 184 | 554 |
| H.M.D. | 2 | 1 | L | 145 | 322 | 384 |
| | | | T | 165 | 308 | 386 |
| D.E.T.A. | 2 | 1 | L | 130 | 270 | 330 |
| | | | T | 140 | 278 | 346 |
| T.E.T.A. | 5 | 1 | L | 147 | 283 | 326 |
| | | | T | 153 | 266 | 324 |
| T.E.P.A. | 10 | 3 | L | 129 | 293 | 348 |
| | | | T | 152 | 311 | 362 |

NOTE.—Mechanical properties determined on rectangular test pieces (width 2.5 cm., length 5 cm.) and at a speed of traction of 250 mm. per min.; H.M.D.=Hexamethylene diamine; D.E.T.A.=Diethylene triamine; T.E.T.A.=Triethylene tetramine; T.E.P.A.=Tetraethylene pentamine.

Similar results were obtained even with very short contact times, e.g. less than 2 seconds, with cold diffusion and cross-linking, i.e. at ambient temperature, for times ranging from 10 to 120 minutes.

EXAMPLE 10

Copolymer II was extruded to form a 2.8 mm. diameter tube which was immersed in a solution of hexamethylene diamine in toluene, whereafter it was washed and dried. Its mechanical properties, compared with those of the non-cross-linked tube, are shown in the following Table VI:

TABLE VI

| Solvent | Cross-linking agent, percent by weight | Contact time in minutes | Creep threshold, kg./cm.² | Breaking load, kg./cm.² | Elongation at break in percent |
|---|---|---|---|---|---|
| Control | | | 74 | 130 | 650 |
| Toluene | 17 | 1 | 88 | 187 | 645 |

EXAMPLE 11

Copolymers I, III and IV were moulded to form 0.2 mm. thick films and then cross-linked by immersion in solutions of polyamines in toluene at 50° C. for one minute, followed by washing and drying. The mechanical properties of the films before and after cross-linking are shown in the following Table VII:

TABLE VII

| Copolymer | Cross-linking agent | Cross-linking agent, percent by weight | Breaking load, kg./cm.² | Elongation at break, percent |
|---|---|---|---|---|
| I | | | 150 | 800 |
| | H.M.D. | 5 | 232 | 400 |
| | D.E.T.A. | 5 | 255 | 400 |
| III | | | 105 | 455 |
| | H.M.D. | 10 | 210 | 440 |
| IV | | | 63 | 44 |
| | H.M.D. | 10 | 180 | 165 |

NOTE.—Rectangular test-pieces (1.5 cm. wide, 5 cm. long); speed of traction: 50 mm. per minute; H.M.D.=Hexamethylene diamine; D.E.T.A.=Diethylene triamine.

EXAMPLE 12

Copolymer I was moulded to form a sheet 2 mm. thick. This sheet was cross-linked by immersion in a 17% by weight hexamethylene diamine solution in toluene, for 12 minutes at 70° C. It was then washed with water immediately on leaving the bath, then dried and placed in a vacuum oven at 70° C. for 2 hours in order to remove any unreacted amine. The melt index of the resultant product was zero. Its gel content was 77.5%; the cross-linked sheet did not undergo any deformation at 150° C. during a period of 1 hour.

EXAMPLE 13

Copolymer I was moulded to form a 3 mm. thick sheet which was cross-linked by immersion in a 17% by weight hexamethylene diamine solution in toluene for 30 minutes at a temperature of 70° C. The sheet was then washed with water and then dried as in Example 9. A cracking test was carried out in accordance with the ASTM Standard D-1693-60T, using Hostapal HL as the surface-active agent. There was no trace of cracking after 2,000 hours. Under the same conditions, ten test-pieces of conventional high-pressure polythene having a melt index of 0.4 or of untreated copolymer I all cracked in less than 20 minutes.

EXAMPLE 14

Copolymer I was moulded to form a 2 mm. thick sheet which was cross-linked by immersion in hexamethylene diamine in the pure state at a temperature of 140° C. for 45 seconds, and then washed and dried. The melt index of the resulting product was zero; its gel content was 77.5%; the cross-linked sheet did not undergo any deformation at 150° C. during a period of 1 hour.

EXAMPLE 15

Copolymer I was moulded to form 0.5 thick sheets which were cross-linked by immersion in 10% by weight polyamine solution in toluene for 15 minutes at a temperature of 50° C., and then washed and dried. The mechanical properties were determined at various temperatures and compared with those of a conventional high-pressure polyethylene having a melt index of 0.4 g./10 min. The results are shown in Table VIII.

TABLE VIII

| Cross-linking agent | Traction temperature, ° C. | Traction speed, mm./min. | Breaking load, kg./cm.² | Elongation at break, percent |
|---|---|---|---|---|
| H.M.D. | 100 | 10 | 49 | 240 |
| | | 100 | 38.4 | 200 |
| D.E.T.A. | 100 | 10 | 52 | 235 |
| | | 100 | 57 | 250 |
| | 105 | 100 | 28 | 157 |
| | 110 | 100 | 11 | 126 |
| P.E. | 100 | 100 | 11 | 90 |
| | 110 | 100 | 1 | |

NOTE.—Mechanical properties on 0.5 mm. thick sheets: test piece ASTM D 638; H.M.D.=Hexamethylene diamine; D.E.T.A.=Diethylene triamine; P.E.=High pressure polyethylene, melt index 0.4 g./10 min.

The good heat-resistance of the cross-linked copolymers will be particularly apparent in this latter test, whereas for example at 105–110° C. the tensile strength of high-pressure polyethylenes is practically zero.

EXAMPLE 16

Laboratory acid carbon black (Monarch 74) or basic carbon black (Sterling MT) and 0.25% of the antioxidant 4-4′-thiobis-6-tertiary-butyl metacresol (Santonox R) were incorporated in the copolymer V by mixing in a 50 g. capacity Brabender mill. 0.5 mm. sheets were immersed for 20 seconds in hexamethylene diamine and then washed and dried at 120° C. The mechanical properties measured with a dynamometer on ASTM D-638 test pieces at 21° C. with a 50 mm. per minute traction speed are shown in Table IX in comparison with the mechanical properties of the copolymer I before and after cross-linking.

TABLE IX

| Measured properties | Copolymer V Non-cross-linked | Copolymer V Cross-linked | Percent by weight of filler in the mixture | Monarch 74 pH=5 Non-cross-linked | Monarch 74 pH=5 Cross-linked | Sterling MT pH=9.5 Non-cross-linked | Sterling MT pH=9.5 Cross-linked |
|---|---|---|---|---|---|---|---|
| Young's modulus, kg./cm.$^2$ | 1,710 | 2,650 | 10 | 2,800 | 3,950 | 1,870 | 2,410 |
| | | | 20 | 3,310 | 4,100 | 1,950 | 2,850 |
| | | | 30 | 4,230 | 5,100 | 2,510 | 3,400 |
| Yield point, kg./cm.$^2$ | 88 | 121 | 10 | 113 | 146 | 100 | 125 |
| | | | 20 | 122 | 150 | 107 | 125 |
| | | | 30 | 144 | 177 | 111 | 136 |
| Breaking strength, kg./cm.$^2$ | 138 | 220 | 10 | 131 | 202 | 110 | 156 |
| | | | 20 | 145 | 230 | 111 | 185 |
| | | | 30 | 154 | 230 | 114 | 163 |
| Elongation at break, percent | 465 | 245 | 10 | 310 | 139 | 90 | 125 |
| | | | 20 | 290 | 140 | 105 | 160 |
| | | | 30 | 250 | 114 | 180 | 135 |

EXAMPLE 17

Eamples of the sheath described in Example 9 were cross-linked by immersion for 1 minute in a 5% by weight ethylene diamine solution in toluene at 70° C. and then washed and dried as before. The permeability of the control sheath and of the cross-linked sheath to gas was measured.

The results are shown in Table X.

TABLE X

| Gas samples | Oxygen | Nitrogen | Co2 |
|---|---|---|---|
| Control sheath | $0.352 \cdot 10^{-3}$ | $0.446 \cdot 10^{-3}$ | $1.115 \cdot 10^{-3}$ |
| Cross-linked sheath | $0.11 \cdot 10^{-3}$ | $0.106 \cdot 10^{-3}$ | $0.508 \cdot 10^{-3}$ |

EXAMPLE 18

Copolymer V, containing 100 p.p.m. of ditert.butyl paracresol as an antioxidant, was moulded into sheets 0.5 mm. thick. The sheets were cross-linked by immersing them in pure hexamethylene diamine for 20 seconds at 120° C., and were then washed and dried in the manner described in Example 9.

A conventional high-pressure polyethylene having the grade 0.3 g./10 min. and containing 150 p.p.m. of ditert. butyl paracresol was cross-linked as follows: 100 parts of the polymer were mixed at 110–120° C. with 5 parts of a 40% mixture of a,a,bis-(tert.butylperoxy)-diisopropyl benzene (Perkadox Y 14–40, sold by Nourylande) and 60% of inert fillers (mainly calcium carbonate). The resulting composition was moulded into sheets 0.5 mm. thick and was cross-linked at 180° C. for 15 minutes.

The resistance to oxidation was tested as follows: the polymers were crushed to powder and kept in pure oxygen at atmospheric pressure at 150° C. Graphs were drawn, showing the volume of absorbed oxygen (ml.) per gramme of polymer, in dependence on time. The graphs were used to determine the induction time $t_1$ at which absorption begins and the time $t_2$ when slow oxidation ends, shown by the point where the prolongation of the rapidly-increasing linear part of the curve intersects the time axis. The results are shown in Table XI (PE= polyethylene).

TABLE XI

| Test substance | | Induction time $t_1$, min. | Time $t_2$ (in min.) when slow oxidation ends |
|---|---|---|---|
| P.E | Not cross-linked | 30 | 94 |
| | Cross linked | 20 | 52 |
| Copolymer V | Not cross-linked | 30 | 88 |
| | Cross linked | 20 | >480 |

The results show that copolymer V when cross-linked with hexamethylene diamine oxidises much more slowly than the other test substances and can therefore withstand a high temperature for a long time without appreciable damage.

An ageing test in ultra-violet was made in a chamber of sheet aluminium at 50° C. The radiation was supplied by a 30-watt mercury vapour TUV 30 Philips tube radiating at 2,537 A. and by 125-watt compressed mercury-vapour HPK 125 Philips lamp radiating a spectrum having a continuous background between 2,500 and 6,000 A. The test was made on 0.5 mm. thick sheets which were either cross-linked or not cross-linked, as shown at the beginning of the present example. For comparison, the same test was made on test pieces which were similarly treated but contained 0.2% by weight of octoxy-4-hydroxy-2-benzophenone (Cyassorb 531 sold by Cyanamid and Co.) as a protective agent.

Table XII shows the times after which the elongations had reached 50% of the initial elongation.

TABLE XII

| | Copolymer V, Without anti-U.V., Not cross-linked | Copolymer V, Without anti-U.V., Cross linked | Copolymer V, With 0.2% of Cyassorb 531, Not cross-linked | Copolymer V, With 0.2% of Cyassorb 531, Cross-linked | P.E., Without anti-U.V., Not cross-linked | P.E., Without anti-U.V., Cross-linked | P.E., With 0.2% of Cyassorb 531, Not cross-linked | P.E., With 0.2% of Cyassorb 531, Cross-linked |
|---|---|---|---|---|---|---|---|---|
| Time in days to reach 50% of the initial elongation | 3 | 14 | <4 | 28 | <3 | <3 | <4 | <4 |

Copolymer V, whether protected or not, had much greater resistance to ultra-violet light than the other test substances, and more particularly was much more resistant than polyethylene cross-linked with peroxide. Similar results were obtained when the operations were repeated, using diethylene triamine instead of hexamethylene diamine.

EXAMPLE 19

Copolymer V was moulded into a sheet 3 mm. thick. The sheet was pre-heated to 110° C. in nitrogen for 10 minutes and was then cross-linked by immersion for 2 minutes in pure hexamethylene diamine at 120° C. It was then washed and dried as described in Example 9. A "Stress-cracking" test was made on six test substances to A.S.T.M. Standard D–1693–60T, using Hostapal H.L. as the cracking agent. No network of lines appeared after 2,000 hours. The resistance to cracking was also very high when tetramethylene diamine was used instead of hexamethylene diamine for cross-linking.

We claim:

1. A method of modifying the physical and chemical properties of a shaped article consisting essentially of an ethylene/maleic anhydride statistical copolymer selected from the group consisting of copolymers of ethylene and maleic anhydride and copolymers of ethylene maleic anhydride and a minor amount of a monomer copolymerisable therewith, which copolymer or terpolymer has been obtained by copolymerisation of the monomers at an elevated pressure, which method comprises treating the shaped polymer at a temperature of from 0° to 250° C., with a primary or secondary polyamine which has a molecular weight greater than 60 whereby said polyamine diffuses into said shaped polymer and at least partially reacts to form a cross-linked copolymer.

2. A method according to claim 1, wherein the polymer to be treated contains from 0.5 to 20% by weight of units derived from maleic anhydride.

3. A method according to claim 1, wherein the polymer is treated with the polyamine in the presence of a solvent or mixture of solvents for the polyamine.

4. A method according to claim 1, wherein the polymer is treated with polyamine only at or near its surface, and in which the polyamine has a molecular weight greater than 140.

5. A method according to claim 4, wherein the polyamine contains at least one substituent group selected from $C_{2-3}$ alkyl, $C_{2-3}$ hydroxyalkyl and $C_{2-3}$ dihydroxyalkyl.

6. A method according to claim 1, wherein the polymer is in the form of a thin shape and is treated with polyamine throughout its thickness, the polyamine having a molecular weight below 200.

7. A method according to claim 6, wherein the polyamine contains at least one $C_{2-3}$ alkyl substituent but is free from any other substituent group.

8. A method according to claim 6, wherein the said shape is less than 1 cm. thick.

References Cited

UNITED STATES PATENTS 3,413,272 11/1968 Rees ---------------- 117—118

FOREIGN PATENTS 864,151 1/1953 Germany.

ALFRED L. LEAVITT, Primary Examiner

J. A. BELL, Assistant Examiner

U.S. Cl. X.R.

117—138.8 E, 138.8 UA, 161 UN; 260—96 R